US006120573A

United States Patent [19]

Call et al.

[11] Patent Number: 6,120,573

[45] Date of Patent: Sep. 19, 2000

[54] MICROMACHINED TEARDROP-SHAPED VIRTUAL IMPACTOR

[75] Inventors: Charles J. Call, Pasco; Patrick T. Call, Richland; Vanessa M. Kenning, Kennewick; Joseph G. Birmingham, Richland; Donald J. Hammerstom, West Richland, all of Wash.

[73] Assignee: MesoSystems Technology, Inc., Richland, Wash.

[21] Appl. No.: 09/191,982

[22] Filed: Nov. 13, 1998

[51] Int. Cl.[7] .................... B01D 45/08

[52] U.S. Cl. .................... 55/442; 55/443; 55/444; 55/524; 55/DIG. 39

[58] Field of Search .................... 55/442, 443, 444, 55/524, DIG. 39

[56] References Cited

U.S. PATENT DOCUMENTS

| | | | |
|---|---|---|---|
| 877,460 | 1/1908 | Brunner et al. . | |
| 902,958 | 11/1908 | Galusha . | |
| 906,038 | 12/1908 | Terry . | |
| 1,603,878 | 10/1926 | Smith . | |
| 1,807,378 | 5/1931 | Budil . | |
| 1,825,274 | 9/1931 | Leach . | |
| 2,939,545 | 6/1960 | Silverman . | |
| 2,956,641 | 10/1960 | Raub et al. | 55/444 |
| 3,693,457 | 9/1972 | Pilat . | |
| 3,754,868 | 8/1973 | Witz et al. . | |
| 3,901,798 | 8/1975 | Peterson . | |
| 3,932,151 | 1/1976 | Lau . | |
| 3,983,743 | 10/1976 | Olin et al. . | |
| 4,133,202 | 1/1979 | Marple . | |
| 4,321,822 | 3/1982 | Marple et al. . | |

(List continued on next page.)

FOREIGN PATENT DOCUMENTS

| | | | |
|---|---|---|---|
| 40901 | 2/1910 | Austria | 55/444 |
| 53931 | 6/1912 | Austria | 55/444 |
| 0290956 | 11/1988 | European Pat. Off. | 55/444 |
| 0 543 108 A1 | 5/1993 | European Pat. Off. . | |
| 626 191 | 8/1927 | France . | |
| 13 10 913 | 9/1934 | Germany . | |
| 2 260 729 | 5/1974 | Germany . | |

OTHER PUBLICATIONS de la Mora, J.F., "Aerodynamic Focusing of Particles and Heavy Molecules, First Annual Report," NTIS, Feb. 16, 1988, 16 pages.

de la Mora, J.F., "Aerodynamic Focusing of Particles and Heavy Molecules. Final Report," NTIS, Jan. 8, 1990, 12 pages.

(List continued on next page.)

*Primary Examiner*—David A. Simmons
*Assistant Examiner*—Minh-Chau T. Pham
*Attorney, Agent, or Firm*—Christensen O'Connor Johnson Kindness PLLC

[57] ABSTRACT

A separation plate (10) includes a first surface (10*a*) and an opposing second surface. A plurality of teardrop-shaped virtual impactor projections (12) are provided on the first surface, preferably in a plurality of rows (13*a*, 13*b*, 13*c*). Each projection includes a convex leading profile (18) facing a fluid stream (16), and two concave side surfaces (19) that are positioned to define a tapered downstream portion. The convex leading profile may include a concave portion (20). The concave portion defines a virtual impact void therethrough. The virtual impact void defines a terminal end of a passageway that extends through the separation plate to communicate with the second surface. When particle-laden fluid is caused to flow along the first surface, a major portion of the fluid containing a minor portion of particles flows around the teardrop-shaped virtual impactor projections along the first surface. A minor portion of the fluid containing a major portion of particles is collected near the convex leading profiles of the projections, and enters the concave portions and the virtual impact voids of the projections. The minor portion of the fluid then travels through the passageways to the second surface of the separation plate, where it can be collected, analyzed, or processed further.

26 Claims, 11 Drawing Sheets

U.S. PATENT DOCUMENTS

| | | | |
|---|---|---|---|
| 4,387,603 | 6/1983 | Nelson . | |
| 4,452,068 | 6/1984 | Loo . | |
| 4,640,140 | 2/1987 | Burghoffer et al. . | |
| 4,670,135 | 6/1987 | Marple et al. . | |
| 4,689,052 | 8/1987 | Ogren et al. . | |
| 4,697,462 | 10/1987 | Daube, Jr. et al. . | |
| 4,764,186 | 8/1988 | Langer . | |
| 4,767,524 | 8/1988 | Yeh et al. . | |
| 4,857,276 | 8/1989 | Seto et al. | 55/444 |
| 4,877,430 | 10/1989 | Gutermuth . | |
| 4,891,052 | 1/1990 | Belin et al. | 55/444 |
| 4,941,899 | 7/1990 | Liu . | |
| 4,942,297 | 7/1990 | Johnson et al. . | |
| 4,990,740 | 2/1991 | Meyer . | |
| 5,040,424 | 8/1991 | Marple et al. . | |
| 5,128,539 | 7/1992 | Rodgers et al. . | |
| 5,254,861 | 10/1993 | Carpenter et al. . | |
| 5,318,609 | 6/1994 | Kittler . | |
| 5,332,550 | 7/1994 | Booker . | |
| 5,412,975 | 5/1995 | Raabe et al. . | |
| 5,425,802 | 6/1995 | Burton et al. . | |
| 5,472,645 | 12/1995 | Rock et al. . | |
| 5,498,271 | 3/1996 | Marple et al. . | |
| 5,512,216 | 4/1996 | Rock et al. . | |
| 5,533,406 | 7/1996 | Geise . | |
| 6,010,554 | 1/2000 | Birmingham et al. | 55/444 |

OTHER PUBLICATIONS de la Mora, J.F., "Drastic Improvement of the Resolution of Aerosol Size Spectrometers via Aerodynamic Focusing: The Case of Variable–Pressure Impactors," *Chemical Engineering Communications*, vol. 151, 1996, pp. 101–124.

de la Mora, J.F., et al., "Aerodynamic Focusing of Particles in a Carrier Gas," *Journal of Fluid Mechanics*, vol. 195, Oct. 1988, pp. 1–21.

Fernandez–Feria, R., et al., "Brownian–Motion Limited Aerodynamic Focusing of Heavy Molecules," Rarefied Gas Dynamics, Beylich, A.E., Ed., Proceedings of the 17th International Symposium on Rarefied Gas Dynamics, Jul. 8–14, 1990, pp. 214–221.

Fuerstenau, S., et al., "Visualization of Aerodynamically Focused Subsonic Aerosol Jets," *Journal of Aerosol Science*, vol. 25, No. 1, Jan. 1994, pp. 165–173.

Hochrainer, D., Institut für Aerobiologie, "Measurement of Aerosol Particle Size Distribution with an Improved Spectral Impactor," NTIS No. N7323533, 1973, 26 pages.

Jurcik, B., et al., "On the Shape of Impactor Efficiency Curves," *Journal of Aerosol Science*, vol. 26, No. 7, 1995, pp. 1139–1147.

Liu, P., et al., "Optimizing the Detection Efficiency of a Low Pressure, In–Situ Particle Monitor Using Aerodynamic Focusing Lenses," *Proceedings —Institute of Environmental Sciences*, 1996, pp. 217–224.

Patent Cooperation Treaty Search Report, PCT–US98–12471, Corona Catalysis Corporation et al., Oct. 14, 1998.

Vance, Richard F., "Slanted Baffle Mist Eliminator", *U.S. Statutory Invention*, Registration No. H1499, Nov. 7, 1995.

MICROMACHINED TEARDROP-SHAPED VIRTUAL IMPACTOR

This invention was made with government support under Contract DAAM01-97-M-0006, awarded by the U.S. Department of Defense. The government has certain rights in this invention.

FIELD OF THE INVENTION

This invention pertains to the field of separating particles from a fluid stream, and more particularly to teardrop-shaped virtual impactor projections that are used to separate a particle-laden fluid stream into a major portion containing a minor portion of particles and a minor portion containing a major portion of particles.

BACKGROUND OF THE INVENTION

The separation and collection of particles/aerosols from an airstream or other fluid streams are of concern in two contexts: first, in analyzing the type and concentration of such particles/aerosols and, second, in cleaning the fluid stream for subsequent use. Additionally, there are occasions in both cases where classification of particles by size is desired. For example, the detection of airborne biological or chemical warfare agents, the detection of biological contamination in confined spaces, such as aircraft or hospitals, or the detection of industrial pollutants (either in ambient fluid or in smokestacks) may be required in various scenarios.

Much effort has been expended in the past in the detection and classification of particles or aerosols in fluid streams. Impactors have been used for collecting aerosol particles for many decades. In the earliest embodiments, a stream of fluid containing the particles was accelerated toward an impactor plate. Due to their inertia, the particles hit the impactor plate and were collected there while the fluid was deflected to the side. With these types of impactors, only heavy particles were collected while particles below a certain "cut size" were carried away by the fluid stream.

However, a significant cause of inaccuracy in such impactors results from the deposition of particles on surfaces of the impactor other than the intended collection surfaces. This phenomenon reduces the accuracy of measurement of total particle mass concentration and of the size-fractionation of particles, since such losses cannot be accurately estimated for aerosols having varying size, shape, or chemistry. Additionally, particles may either reentrain in the fluid stream or bounce from the impactor's collection surface upon impact.

To remedy this problem "virtual" impactors have been developed that separate particles from a fluid stream by forces other than impaction. Virtual impactors may operate on a number of different principles, but all avoid actual "impact" and rely on differences in particle mass to induce inertial separation. Specifically, a particle-laden fluid stream is directed toward a surface presenting an obstruction to the forward movement of the fluid stream. The surface includes a void at the point where the particles would normally impact the surface. When a major portion of the fluid stream changes direction to avoid the obstruction presented by the surface, fine particles remain entrained in the deflected major portion of the fluid stream. Heavier or more dense particles, on the other hand, fail to change direction and are collected in a region of relatively stagnant fluid (a "dead air zone") created near the surface. The heavier particles entrained in a minor portion of the fluid stream enter the void defined through the surface, where they can be captured or analyzed.

Because typical virtual impactors do not actually collect particles themselves, but merely redirect them into two different fluid streams according to their mass, they are essentially free of the problems of particle bounce and reentrainment associated with actual impactor devices. Some examples of virtual impactors can be found in U.S. Pat. Nos. 3,901,798; 4,670,135; 4,767,524; 5,425,802; and 5,533,406.

The present invention advances the technology of virtual impactors and provides new designs creating more efficient or more specific separations.

SUMMARY OF THE INVENTION

The present invention provides a separation plate that is used to separate particles from a fluid stream. The separation plate includes a first surface and an opposing second surface. The first surface is provided with a plurality of teardrop-shaped virtual impactor projections arranged in at least one row. The projection includes a convex leading profile and two generally concave side surfaces that are positioned to provide a tapered downstream "tail". The convex leading profile defines a virtual impact void therethrough. In one embodiment of the teardrop-shaped virtual impactor projection, the convex leading profile includes a concave portion near its apex, and the virtual impact void is defined through the concave portion. The virtual impact void defines a terminal end of a passageway that extends through the separation plate to communicate with the second surface. In a preferred embodiment, a plurality of projections are provided in a plurality of rows.

When a particle-laden fluid stream is caused to flow along the first surface of the separation plate, a major portion of the fluid stream containing a minor portion of particles (hereinafter "major flow") changes direction to avoid the obstruction presented by the convex leading profiles of the teardrop-shaped virtual impactor projections, and flows around the projections to travel along the first surface. A minor portion of the fluid stream containing a major portion of the particles (hereinafter "minor flow") is collected near the convex leading profiles, where a "dead air zone" is created, and enters the virtual impact voids. The particles entrained in the minor flow travel along the passageways through the separation plate to the second surface, where they can be collected or analyzed.

In another aspect of the present invention, the separation plate may be incorporated in a virtual impact collector. The virtual impact collector comprises the separation plate, a cover plate placed over the teardrop-shaped virtual impactor projections, and a chamber at least partially defined by the cover plate and the first surface. The chamber includes an intake and a vent. In operation, a fluid stream enters the chamber from the intake, and flows through the projections on the first surface, whereby it is separated into a major flow and a minor flow. The major flow is exhausted from the chamber through the vent. The minor flow is directed through the virtual impact voids and the passageways to the second surface, where it can be collected, analyzed, or processed further in any other manner.

In another aspect of the present invention, the teardrop-shaped projections may be arranged in a circle on the first surface. The teardrop-shaped projections are arranged so that their convex leading profiles face generally radially outward. The first surface further defines within itself a path, including an inlet leading to a circular path. The circular path is arranged to surround the plurality of projections. When a fluid stream enters the inlet and follows the circular path, at least a portion of relatively heavy or dense particles are centrifugally separated toward the outer periphery of the circular path. The fluid stream containing the remainder of the particles follows the circular path and spirally advances to the projections, which separate the fluid stream into a minor flow and a major flow as described above.

In another aspect of the present invention, the teardrop-shaped projections may be provided in various sizes to separate particles of various sizes.

In yet another aspect of the present invention, the first surface and the surfaces of the teardrop-shaped virtual impactor projections may be electrically charged to repel particles that are oppositely charged.

A method of separating particles from a fluid stream using a separation plate of the present invention is also provided. The method includes providing the separation plate of the present invention having a first surface and an opposing second surface, and providing a cover plate over the first surface to sandwich therebetween the plurality of teardrop-shaped virtual impactor projections provided on the first surface, thereby forming a chamber between the first surface and the cover plate. The method further includes causing the fluid stream to enter the chamber and flow along the first surface, wherein the teardrop-shaped virtual impactor projections separate the fluid stream into a major flow on the first surface and a minor flow on the second surface.

While it is contemplated that the most likely use environment of the present invention will be detection of biological warfare agents in the form of aerosols in an ambient fluid stream, the invention can be used in numerous other environments, such as collection of industrial pollutants in ambient fluid, collection of stack fluids, sampling of fluid in buildings associated with "sick building" syndrome, collection of infectious or disease-causing organisms in hospitals, and the collection of radioactive particles or toxic vapors. It is also contemplated that the present invention may be used for the detection and collection of airborne particles associated with illegal drugs or their precursors.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

In the present description, the prefix "micro" is applied generally to components that have submillimeter size features. Microcomponents are fabricated using micromachining, techniques known in the art, such as micromilling, photolithography, deep ultraviolet (or x-ray) lithography, electrodeposition, electrodischarge machining (EDM), laser ablation, and reactive or nonreactive ion etching.

Also as used hereinafter, the following terms shall have the following definitions:

Projection—an obstruction including a virtual impact surface placed in a fluid stream, the surface causing the formation of a zone of stagnant fluid and dividing the fluid stream into major and minor components for the separation of particles entrained therein, without any substantial impaction between the particles and the projection;

Particle—any separately identifiable solid, liquid, aerosol, or other component entrained in a fluid stream that has a greater mass than the fluid forming the fluid stream, and is the subject of separation and collection for analysis;

Fluid—any fluid susceptible to fluid flow, which may comprise liquids or gases, and which may entrain foreign particles therein. Unless otherwise noted, fluid shall mean the ambient fluid containing unconcentrated particles for collection, not the fluid into which the particles are concentrated after collection or capture.

Figure 1A:
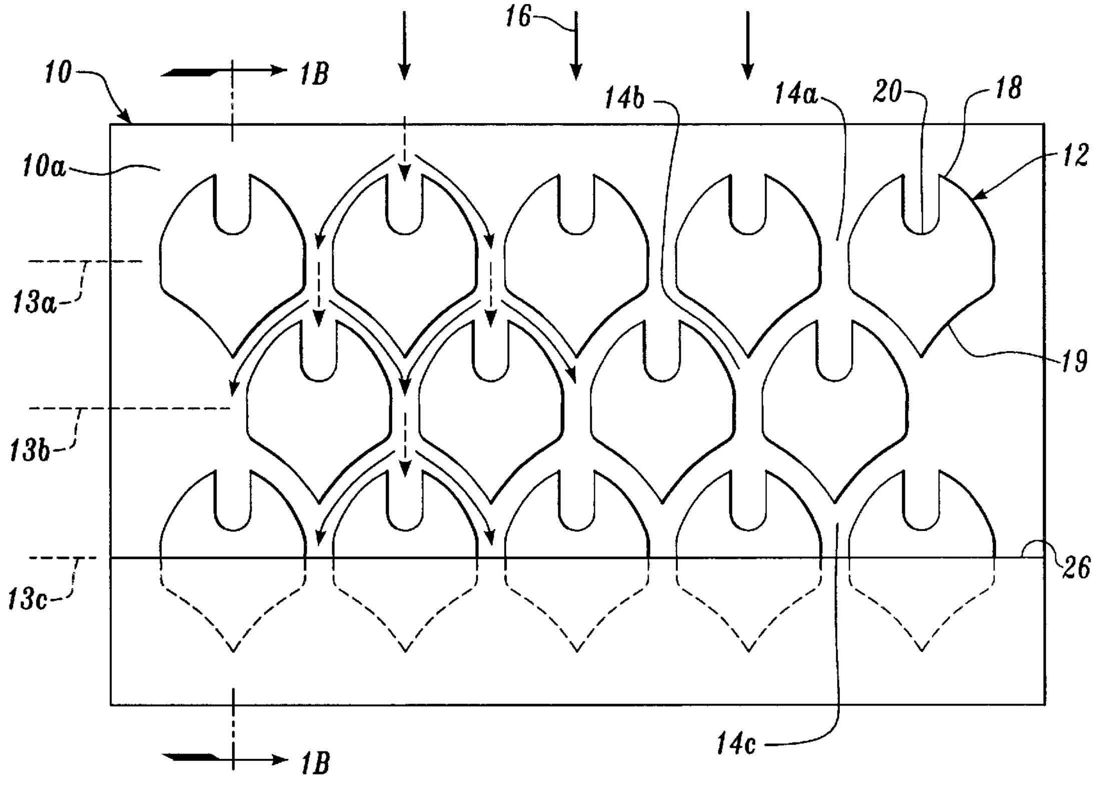
FIG. 1A is a plan view of a separation plate of the present invention, including a plurality of teardrop-shaped virtual impactor projections.
Figure 1B:
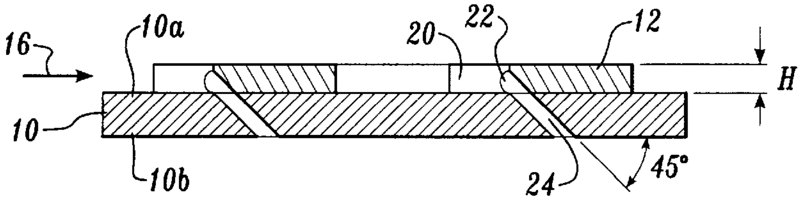
FIG. 1B is a cross-sectional view of the separation plate taken along line 1B—1B of FIG. 1A.

FIGS. 1A and 1B illustrate a virtual impact separation plate 10 formed in accordance with the present invention. Separation plate 10 may be formed of any material suitable for micromachining, such as plastics and metals. Separation plate 10 includes a first surface **10*a* and an opposing second surface 10*b*. The first surface 10*a* includes a plurality of generally teardrop-shaped projections 12 arranged in a plurality of rows, for example, in a first row 13*a*, a second row 13*b*, and a third row 13*c*. Projections 12 in first row 13*a* are spaced apart from each other and define first fluid passageways 14***a* therebetween. First fluid passageways 14*a* generally taper in the direction of a particle-laden fluid stream 16. Projections 12 in second and third rows 13*b*, 13*c*, respectively, are also spaced apart from each other to define second and third fluid passageways 14*b*, 14*c* therebetween. Projections 12 in second row 13*b* are offset from projections 12 in first and third rows 13*a*, 13*c*, so that first fluid passageways 14*a*, the centerlines of projections 12 in second row 13*b*, and third fluid passageways 14*c* are aligned. Referring specifically to FIG. 1B, each projection 12 has a height "H" and presents an obstruction to the advancing particle-laden fluid stream 16.

Figure 1C:
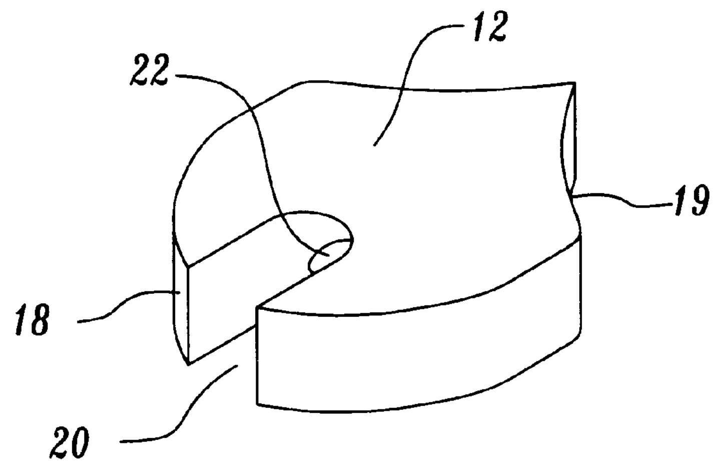
FIG. 1C is a perspective view of a teardrop-shaped projection of FIG. 1A.

Referring additionally to FIG. 1C, projection 12 includes an upstream convex leading profile 18 that includes a concave portion 20, and two generally concave side surfaces 19 that are positioned to provide the projection 12 with a tapered downstream concave side surface. Throughout the present description, the terms "upstream" and "downstream" are used to refer to the direction of fluid streams flowing through the plurality of projections. Each concave portion 20 defines a virtual impact void 22 therethrough. Preferably, concave portion 20 is included at the apex of convex leading profile 18, and virtual impact void 22 is defined at the apex of concave portion 20. Each virtual impact void 22 defines a terminal end of a passageway 24 that extends through separation plate 10 to communicate with second surface 10*b*. Virtual impact voids 22 and passageways 24 may be formed by drilling holes through concave portions 20 and the separation plate 10, preferably at an acute angle with respect to separation plate 10, as more fully described below.

Convex leading profiles 18 present obstructions to an advancing particle-laden fluid stream. Specifically, referring to FIG. 1A, when particle-laden fluid stream 16 advances to first row 13*a* of projections 12, a major portion (at least 50%, preferably approximately 90% or more) of the fluid stream containing a minor portion (less than about 50%) of particles above a predetermined particle diameter size, or "cut size", (hereinafter "major flow") changes direction to flow around projections 12, as indicated by solid arrows. Throughout the present description, particle mass density is assumed to be approximately 1 gm/cm$^3$, as typically understood in the art. A minor portion (less than 50%, preferably approximately 10% or less) of the fluid stream containing a major portion (at least about 50%) of particles above the predetermined "cut size", (hereinafter "minor flow") is collected near the apex of convex leading profiles 18 and enters concave portion 20, where a zone of stagnant fluid is created, as indicated by dotted arrows. The "cut size" means a particle diameter at which at least 50% of the particles of that diameter entrained in a fluid flowing through the projections are separated from the fluid stream. For particles having a diameter above the cut size, preferably more than 50% of the particles entrained in the fluid are separated.

The particles entrained in the minor flow are collected in concave portions 20 and enter virtual impact voids 22, and travel through passageways 24 to second surface 10*b* of separation plate 10, where they can be collected, analyzed, or processed further in other manners. Preferably, virtual impact void 22 and passageway 24 are formed at an angle as acute as possible with respect to separation plate 10 so that a minor flow containing a major portion of particles will avoid sharp changes in direction upon entering virtual impact void 22. It should be noted that the longer the passageway 24, the more particles may be deposited on the inner surfaces of the passageway 24. Therefore, while the angle of passageway 24 should be acute as possible, the length of the passageway 24 cannot be indefinitely long. The optimum combination of the angle and the length of the passageway 24 is to be determined based partly on the limitations imposed by the available micromachining methods. An angle of approximately between 15 and 45 degrees, which is possible with currently available micromachining methods, should provide satisfactory results.

The major flow that flows around projections 12 in first row 13*a* advances to convex leading profiles 18 of projections 12 in second row 13*b*. As described above, two adjacent projections 12 in first row 13*a* cooperate to define one first fluid passageway 14*a* that generally tapers in the direction of fluid stream 16. First fluid passageways 14*a* serve to aerodynamically accelerate the major flow flowing around projections 12 in first row 13*a* toward convex leading profiles 18 of projections 12 in second row 13*b*. Again, convex leading profiles 18 in second row 13*b* separate the fluid stream into a minor flow and a major flow, and the major flow flows around projections 12 in second row 13*b* to advance to projections 12 in third row 13*c*. At this point, generally concave side surfaces 19 of projections 12 in first row 13*a* cooperate with convex leading profiles 18 of projections 12 in second row 13*b* to direct and aerodynamically accelerate the major flow to second fluid passageways 14*b* and to convex leading profiles 18 of projections 12 in third row 13*c*. Thus, concave side surfaces 19 that define the "tail" portion of projection 12 ensure continuous aerodynamic flows of fluid streams through projections 12. Accordingly, when teardrop-shaped virtual impactor projections 12 of the present invention are provided in a plurality of rows, the projections in a row serve to aerodynamically focus fluid streams advancing toward the projection in an immediately downstream row, thereby enhancing the separation efficiency of the projections in the immediately downstream row.

When third row 13*c* is the last downstream row of projections 12, concave side surfaces 19 of projections 12 in third row 13*c* may not be provided and, thus, projections 12 in third row 13*c* may take a generally haystack shape, with their tail portions defined by concave side surfaces 19 trimmed away downstream of a line 26.

Figure 1D:
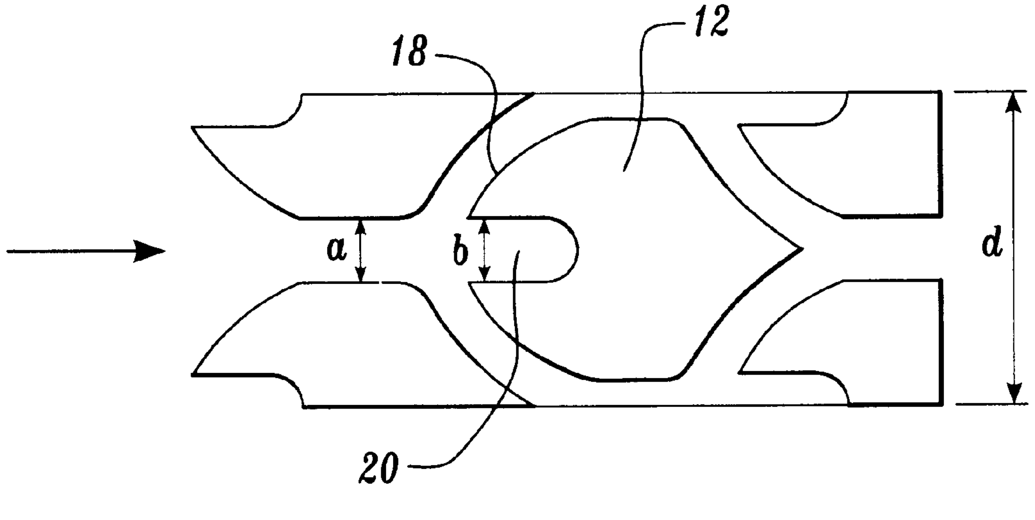
FIG. 1D is an enlarged plan view of the teardrop-shaped projections of FIG. 1A.

Detailed configurations of the projections are illustrated in FIG. 1D, in which only one complete projection is shown, and its neighboring projections are only partially shown to illustrate the relative positions of the projections. FIG. 1D shows a "column" of projections that includes three rows of projections in the direction of a fluid stream as indicated by an arrow. The most downstream projection is generally haystack-shaped, as described above. The width of the column is represented as "d". A distance between two adjacent projections is represented by "a", and a distance across each concave portion is represented by "b". For certain cut sizes, it may be desirable to have "a" greater than "b"; in other situations, it may be desirable to have "b" greater than "a". For separating particles having a diameter of one to three microns, it has been found that making "a" greater than "b" generally reduces recirculation of a minor flow upon entering the concave portion, which is preferable for efficiently separating a minor flow.

An example of a separation plate 10 constructed in accordance with the present invention, together with its particle separation efficiency data, will be described below in the Examples section (Example 1).

Figure 2A:
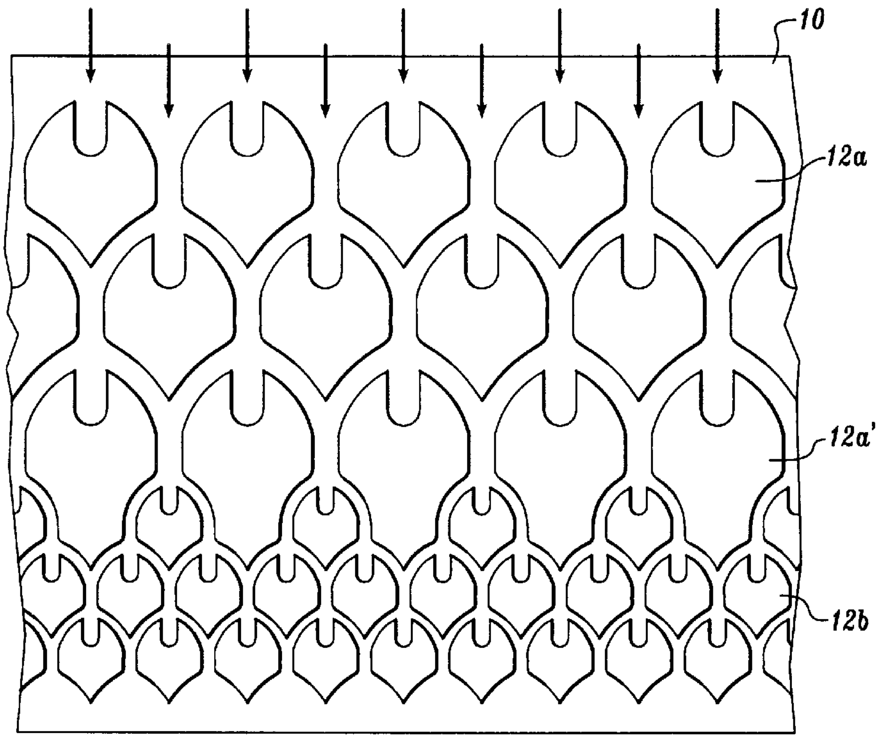
FIG. 2A is a plan view of a separation plate of the present invention including teardrop-shaped projections of various sizes and alternative teardrop-shaped projections.
Figure 2B:
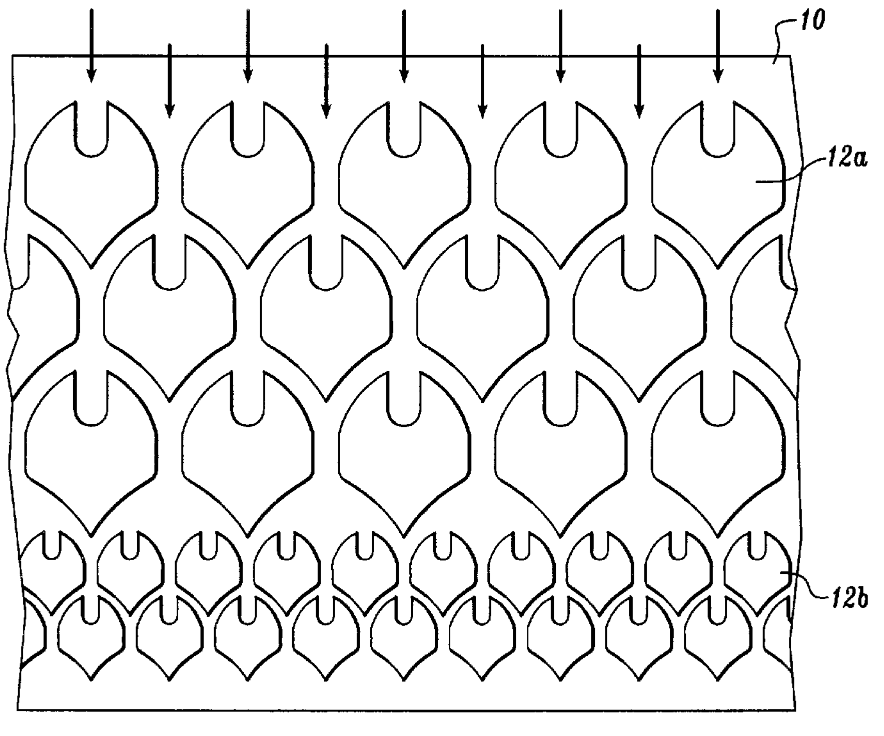
FIG. 2B is a plan view of another configuration of a separation plate including teardrop-shaped projections of various sizes.

A separation plate of the present invention may be easily modified to analyze virtually any volume of fluid stream at any flow rate, by varying the number of rows and columns of projections provided on the separation plate. Furthermore, it should be understood that those skilled in the art can construct and optimize the separation plate of the present invention to meet a specific "cut size" requirement for a given flow rate. For example, the "cut size" of a projection may be modified by scaling up or down the projection size; larger projections with proportionately larger concave portions and spacing between the projections can be used to separate larger particles, while conversely smaller projections with proportionately smaller concave portions and projection spacing can be used to separate smaller particles. As schematically illustrated in FIGS. 2A and 2B, larger projections 12*a* and smaller projections 12*b* may be provided together on one separation plate 10, to separate particles of different sizes successively. The configurations of the most downstream larger projections 12*a*' may be modified as illustrated in FIG. 2A, to ensure continuous aerodynamic flow of fluid streams through the transition from larger projections 12*a* to smaller projections 12*b*.

Figure 3A:
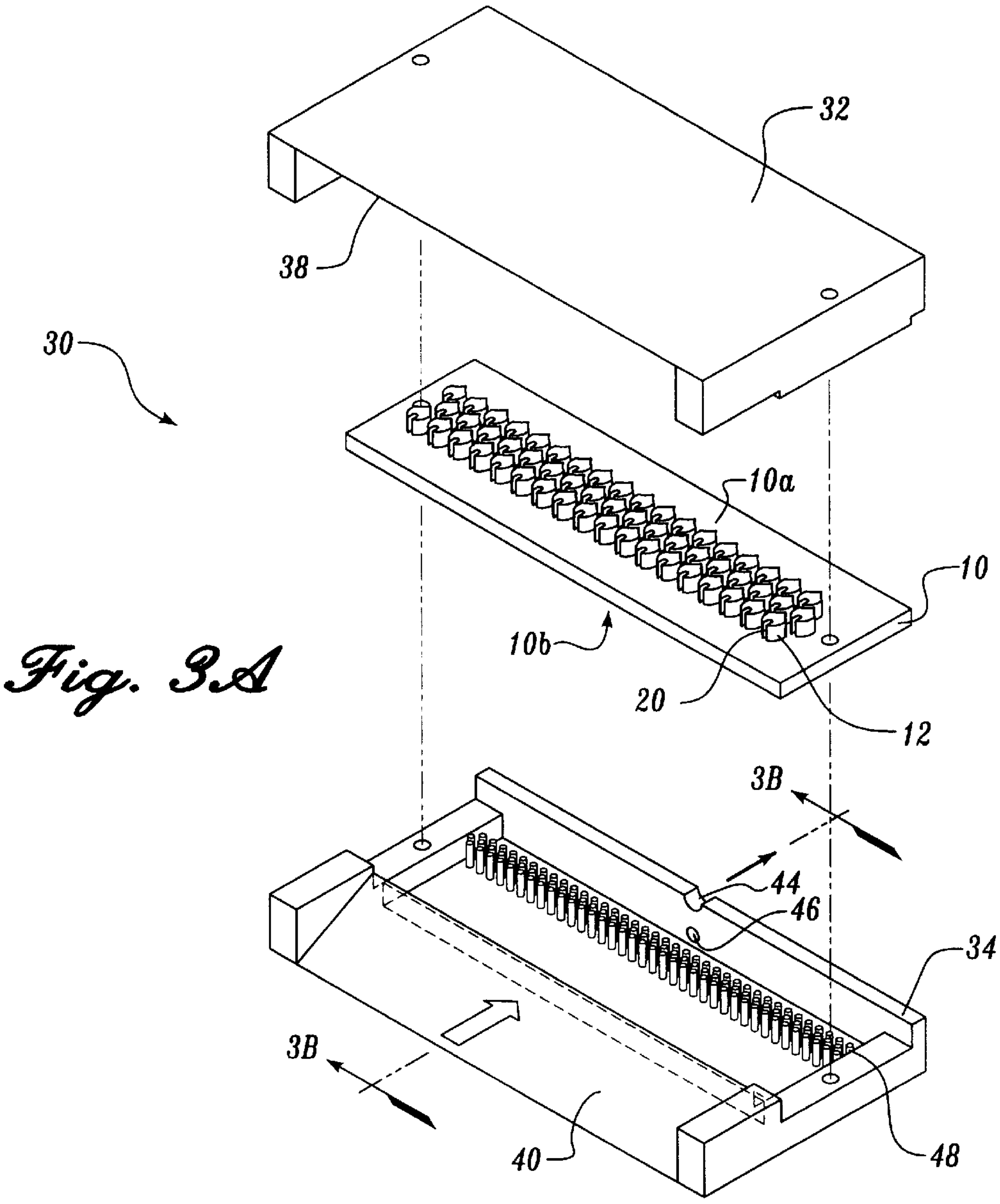
FIG. 3A is an exploded view of a virtual impact collector incorporating the separation plate of FIG. 1A.

Separation plate 10 of the present invention may be easily incorporated into various particle collection/concentration apparatus. FIG. 3A illustrates an example of such apparatus, a virtual impact collector 30 formed in accordance with the present invention. Virtual impact collector 30 includes a rectangular separation plate 10 of the present invention including a first surface 10*a* and an opposing second surface 10*b*, a rectangular top cover plate 32, and a rectangular bottom cover plate 34. Both top cover plate 32 and bottom cover plate 34 are sized and designed to mate with each other as described below in more detail. Top and bottom cover plate 32, 34 may be formed by injection molding from conventional materials such as thermoplastics or thermoset resins.

Figure 3B:
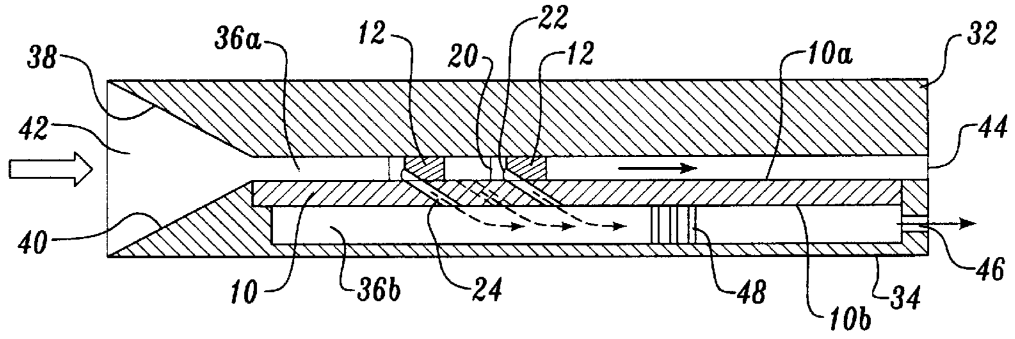
FIG. 3B is a cross-sectional view of the collector taken along line 3B—3B of FIG. 3A.

Referring additionally to FIG. 3B, separation plate 10 is fitted between top cover plate 32 and bottom cover plate 34. First surface 10*a* of separation plate 10 and the top cover plate 32 are configured so as to together define a first chamber 36*a* therebetween. Second surface 10*b* of separation plate 10 and bottom cover plate 34 are configured so as to together define a second chamber 36*b* therebetween. Top and bottom cover plates 32, 34 may include tapered leading edges 38, 40 to define a tapered intake 42 to laminarize the fluid stream that enters first chamber 36*a* through tapered intake 42. Top cover plate 32 includes a vent 44 at the opposite edge from tapered leading edge 38 to provide an outlet to first chamber 36*a*, through which a major flow may be exhausted. Bottom cover plate 34 may include a minor flow outlet 46 to provide an outlet to second chamber 36*b*, through which a minor flow may be exhausted. Optionally, a plurality of micromachined impactors 48 may be placed within second chamber 36*b* to collect particles thereon, as more fully described below. Each component of virtual impact collector 30 is machined such that a simple film or layer of, for example, silicon gel, is sufficient to ensure fluidtight integrity of the collector. All components are preferably secured to one another with screws or other securing devices (not shown).

In operation, a particle-laden fluid stream is supplied through tapered intake 42 into first chamber 36*a*. As the fluid flows through projections 12, a major flow negotiates turns around projections 12 and exits first chamber 36*a* through vent 44. It should be understood that any pressure difference between the area near the tapered intake 42 and the area near vent 44 induces the major flow. Such flow may be induced by a pump, a fan, an eductor, or any other device for inducing a pressure differential. A minor flow is directed through concave portions 20, virtual impact voids 22, and passageways 24 into second chamber 36*b*, as indicated by dotted arrows, where it can be collected or analyzed. Again, it should be understood that any pressure difference between first chamber 36*a* and second chamber 36*b* establishes the minor flow, and the present invention is not limited by any specific means for inducing the flow. The minor flow may be exhausted from second chamber 36*b* through minor flow outlet 46 for further processing. When micromachined impactors 48 are employed in second chamber 36*b*, they are strategically placed downstream of passageways 24 to receive the minor flow. Some particles that are entrained in the minor flow may impact impactors 48 and become deposited thereon. The particles collected on impactors 48 may be subsequently collected, for example, by washing the impactors with a small amount of liquid to capture the particles therein. An example of impactors suitable for use in conjunction with the virtual impact separation plate of the present invention can be found in copending U.S. patent application, Ser. No. 09/191,979 filed concurrently herewith and assigned to the same assignee, which is herein expressly incorporated by reference.

When a virtual impact collector includes a separation plate of the present invention having teardrop-shaped projections of various sizes, as illustrated in FIGS. 2A and 2B, it may be advantageous to divide second chamber 36*b* into several compartments. For example, a first compartment may be provided within second chamber 36*b* to receive a minor flow from larger projections 12*a* (FIGS. 2A, 2B) for collecting larger particles therein, and a second compartment may be provided to receive a minor flow from smaller projections 12*b* for collecting smaller particles therein. In this manner even more specific separation of particles can be achieved.

Figure 4:
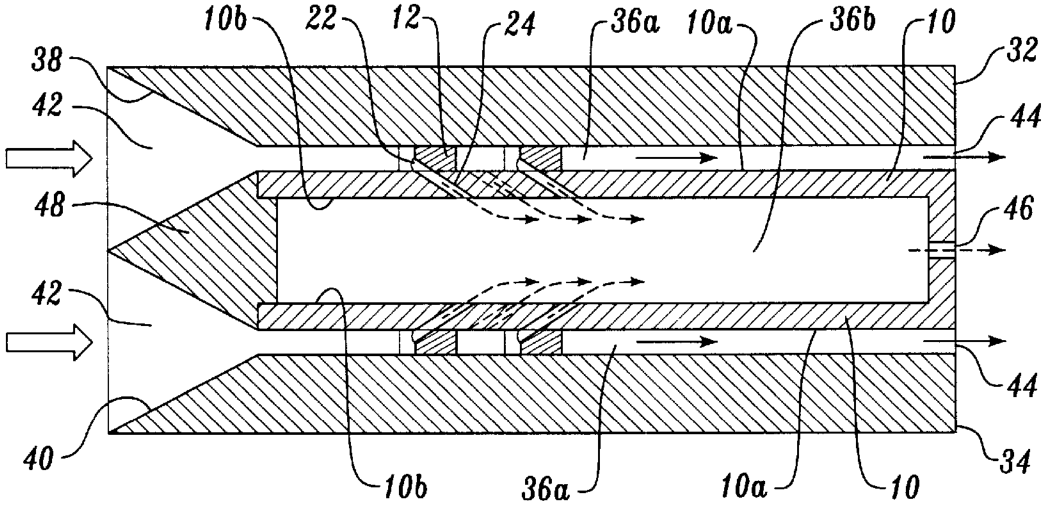
FIG. 4 is a cross-sectional view of a modification of the collector of FIG. 3A.

FIG. 4 illustrates a modification of the virtual impact collector 30 of FIG. 3A, which includes two spaced-apart separation plates 10 configured in accordance with the present invention. Second surfaces 10*b* of separation plates 10 are arranged to face each other to together define at least a portion of a second chamber 36*b* therebetween. A member 48 having a generally triangular cross section may be provided to position separation plates 10 in a spaced-apart manner and to at least partially define second chamber 36*b*, as illustrated. As before, a minor flow outlet 46 may be provided to second chamber 36*b*. Two separation plates 10 are placed between a top cover plate 32 and a bottom cover plate 34 that are sized and designed to mate with each other, and to each form a first chamber 36*a* with first surface 10*a* of each separation plate 10. Top and bottom cover plates 32, 34 may include tapered leading edges 38, 40, each of which cooperates with member 48 to define a tapered intake 42 to laminarize a fluid stream which enters each first chamber 36*a*. Top and bottom covers 32, 34 include vents 44 at the opposite edges from tapered leading edges 38, 40 to provide outlets for respective first chambers 36*a*.

In operation, fluid enters first chambers 36*a* through respective tapered intakes 42, and flows through projections 12 provided on first surfaces 10*a* of each of separation plates 10. A major flow exits first chambers 36*a* through vents 44. A minor flow enters virtual impact voids 22 and travels through passageways 24 to second chamber 36*b*, where minor flows from both separation plates 10 join together to form a common minor flow. As before, major and minor flow are established by pressure difference created by any suitable means. The common minor flow may then be exhausted through minor flow outlet 46 for further processing.

It should be understood that more than two separation plates 10 may be arranged, with their second surfaces generally facing each other to define at least a portion of a second chamber for receiving a common minor flow. For example, three separation plates 10 may be provided to form a virtual impact collector having a generally triangular cross-section, or four separation plates 10 may be provided to form a collector having a generally square cross-section.

Figure 5:
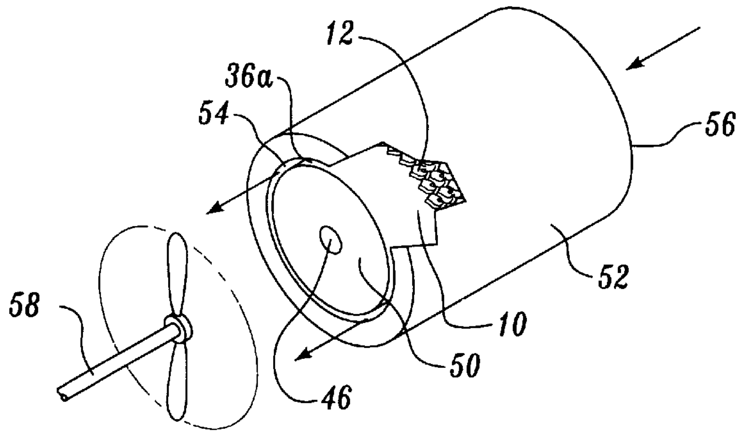
FIG. 5 is a schematic perspective view of another modification of the collector of FIG. 3A.

A further modification of a virtual impact collector formed in accordance with the present invention is schematically illustrated in FIG. 5. In this embodiment, separation plate 10 of FIG. 5A is joined at its opposing edges to form a cylinder. Both axial ends of the cylinder are sealed to form closed ends (only one closed end 50 is shown). The second surface of separation plate 10 forms the inner surface of the cylinder to at least partially define a second chamber (not shown) within. The cylindrical separation plate 10 is coaxially slid into a tube 52 having two open ends 54, 56, to form an annular first chamber 36*a* therebetween. Open end 54 and one of the closed ends 50 together define an annular vent for first chamber 36*a* therebetween, and open end 56 and the other closed end of the cylinder together define an annular intake for first chamber 36*a* therebetween. As before, a suitable minor flow outlet 46 may be provided through closed end 50 to vent minor flows from the second chamber.

The operation of the modified virtual impact collector of FIG. 5 is the same as other virtual impact collectors described above. In the schematic illustration, a suction fan 58 is provided adjacent the vent to create a pressure difference for inducing a major flow. A second fan (not shown) may be provided on the inner surface of closed end 50 to induce a minor flow. As described above, any suitable pressure difference will suffice for inducing both major and minor flows, and suction fan 58 is illustrated only as an example of means for inducing a major flow.

Virtual impact collectors of various configurations, as described above, may be mass-produced, and a plurality of collectors may be used in parallel to adjustably increase throughput, or in series to further refine particle separation process. When a plurality of collectors are used in accordance with the present invention, it may be advantageous to configure each collector to capture particles of a successively different size.

Figure 6A:
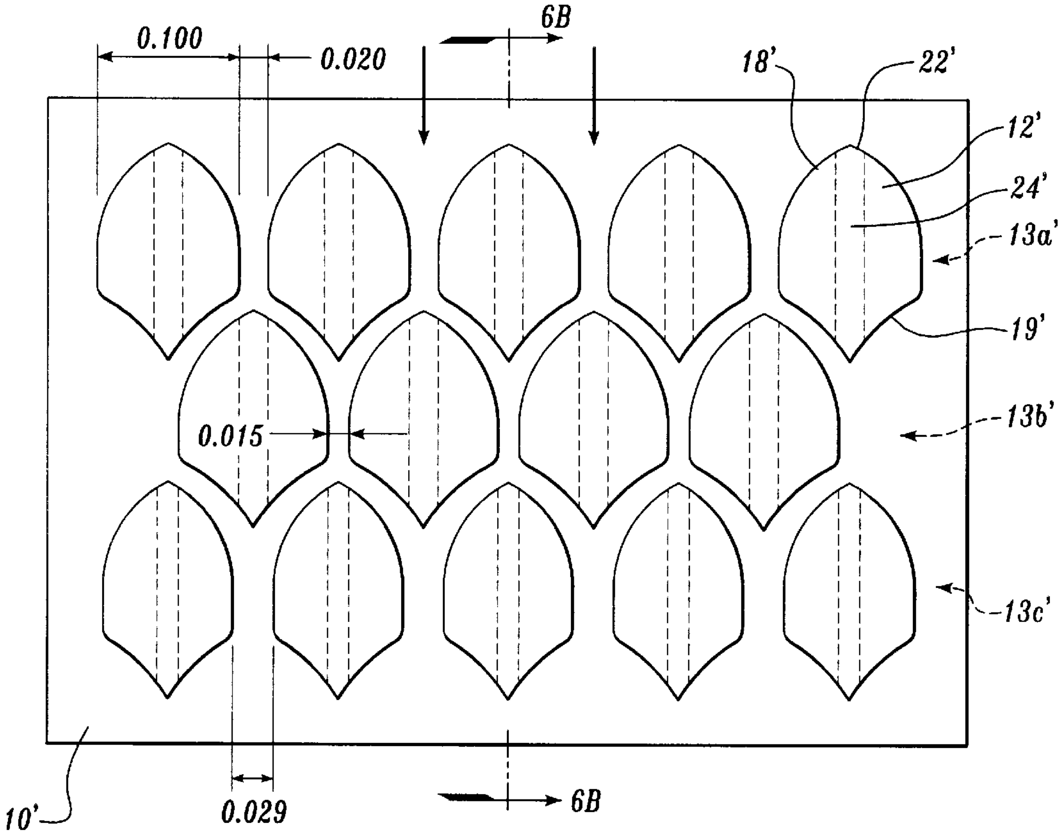
FIG. 6A is a plan view of a separation plate in accordance with the present invention including an alternative teardrop-shaped projection.
Figure 6B:
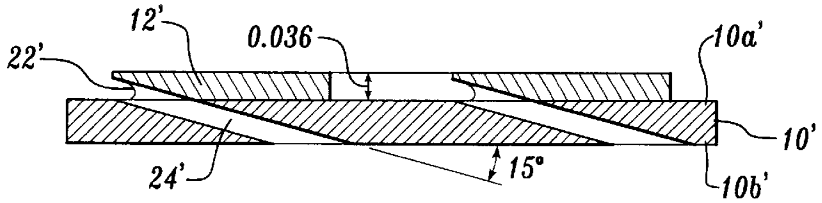
FIG. 6B is a cross-sectional view of the separation plate taken along line 6B—6B of FIG. 6A.

FIGS. 6A and 6B illustrate an alternative configuration of teardrop-shaped projections of the present invention, arranged on a separation plate 10' having a first surface 10*a*' and a second surface 10*b* '. Separation plate 10' includes a plurality of teardrop-shaped projections 12' arranged in a plurality of rows 13*a*', 13*b*', and 13*c*'. The teardrop-shaped projection 12' includes a convex leading profile 18' and two concave side surfaces 19' that are positioned to define a tapered downstream tail portion, in the same manner as teardrop-shaped projection 12 of FIG. 1A. The convex leading profile 18' includes a virtual impact void 22' therethrough. The virtual impact void 22' defines a terminal end of a passageway 24' that extends through separation plate 10'. Projection 12' does not include a concave portion 20 present in projection 12 of FIG. 1A.

In operation, teardrop-shaped projections 12' provided on separation plate 10' separate particle-laden fluid streams into a major flow and a minor flow in a similar manner as separation plate 10 of FIG. 1A. Specifically, as before, teardrop-shaped projections 12' in first row 13*a*' serve to aerodynamically accelerate fluid streams toward convex leading profiles 18' of teardrop-shaped projections 12' in second row 13*b*'. Also as before, concave side surfaces 19' of projections 12' in first row' cooperate with convex leading profiles 18' of projections 12' in second row 13*b*' to aerodynamically accelerate fluid streams toward convex leading profiles 18' of projections 12' in third row 13*c*'. As a fluid stream advances toward convex leading profile 18' of each projection 12', a zone of stagnant fluid is created near convex leading profile 18', in which a minor flow is collected. The minor flow enters virtual impact voids 22' defined through convex leading profiles 18', and travels through passageways 24' to the second surface, where it can be collected, analyzed, or processed further. Projection 12' of FIG. 6A is configured so that passageway 24' will form a smaller angle with respect to separation plate 10', as compared to projection 12 of FIG. 1A. As discussed above, this may be preferable in allowing a minor flow to avoid a sharp change in direction upon entering virtual impact void 22'. As a minor flow experiences less sharp edges, less particle deposition onto sharp edges will occur. The dimensions included in FIGS. 6A and 6B (all in inches) are selected to form a separation plate 10' having a cut size of approximately 0.8 microns at a flow rate of approximately 25 liters per minute (LPM). As with separation plate 10 of FIG. 1A, those skilled in the art may readily optimize separation plate 10' of FIG. 6A for a desired cut size, flow rate, and throughput.

Figure 7:
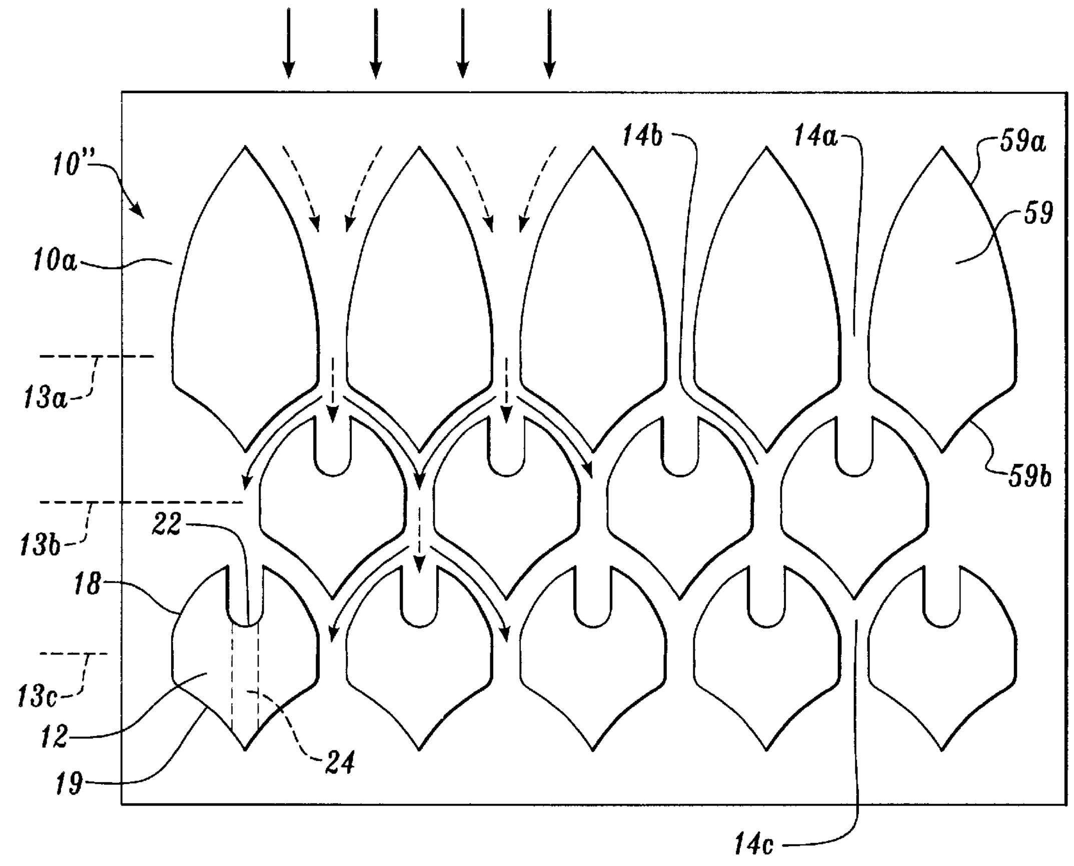
FIG. 7 is a plan view of a separation plate in accordance with the present invention including a plurality of nozzle projections arranged in an upstream row.

FIG. 7 illustrates a further alternative configuration of a separation plate including a plurality of teardrop-shaped projections of the present invention. A separation plate 10" includes a plurality of teardrop-shaped projections 12 of FIG. 1A arranged in downstream second and third rows 13*b* and 13*c*. As before, the teardrop-shaped projection 12 includes a convex leading profile 18 and two concave side surfaces 19 that are positioned to define a tapered downstream tail portion. The convex leading profile 18 includes a virtual impact void 22 therethrough. The virtual impact void 22 defines a terminal end of a passageway 24 that extends through separation plate 10". Separation plate 10" further includes a plurality of nozzle projections 59 arranged in an upstream first row 13*a*. Nozzle projection 59 includes a tapering leading profile 59*a* and two concave side surfaces 59*b* that are positioned to define a tapered downstream tail portion. Tapering leading profiles 59*a* of adjacent nozzle projections 59 cooperatively define generally tapering first passageways 14*a* therebetween. A downstream end of each first passageway 14*a* is placed adjacent convex leading profile 18 of each teardrop-shaped virtual impactor projection 12 that is placed immediately downstream of the first passageway 14*a*.

In operation, as particle-laden fluid streams entering separation plate 10" are caused to flow through tapering first passageways 14*a*, nozzle projections 59 serve to lessen any turbulence of the fluid streams and aerodynamically focus the particles before they virtually impact virtual impact voids 22 of teardrop-shaped projections 12 arranged in second row 13*b*. The rest of the operation of separation plate 10" is substantially the same as separation plate 10 of FIG. 1A.

It should be understood that separation plate 10' of FIG. 6A and separation plate 10" of FIG. 7 may be incorporated in various particle separation/collection apparatus including various virtual impact collectors as described above, in the same manner as separation plate 10 of FIG. 1A.

Figure 8A:
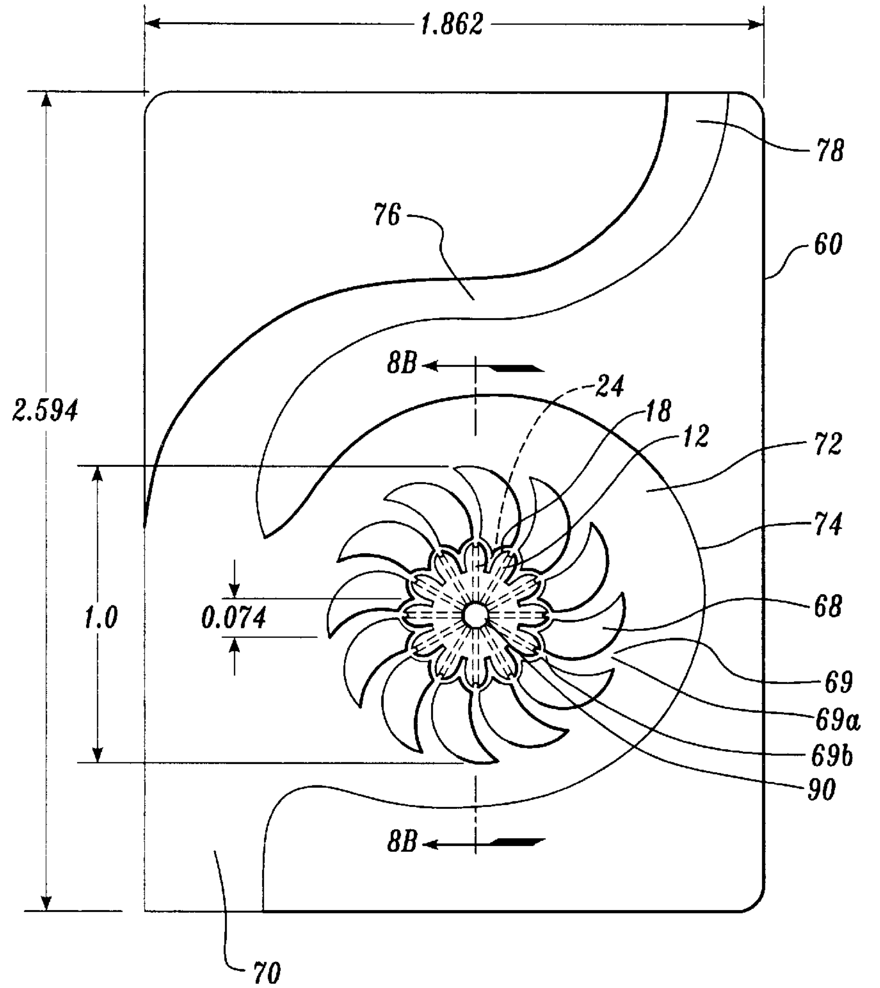
FIG. 8A is a plan view of another embodiment of a separation plate of the present invention, including a plurality of teardrop-shaped projections arranged in a circle.
Figure 8B:
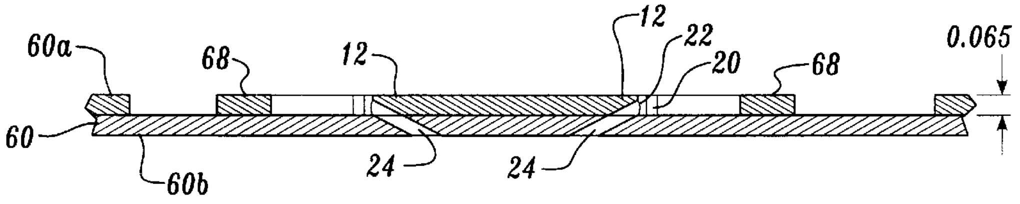
FIG. 8B is a cross-sectional view of the separation plate taken along line 8B—8B of FIG. 8A.

FIGS. 8A and 8B illustrate another embodiment of a separation plate 60 in accordance with the present invention having a first surface 60*a* and an opposing second surface 60*b*.On first surface 60*a*, a plurality of teardrop-shaped virtual impactor projections 12, as illustrated in FIG. 1A, are arranged in a circular row. As before, projection 12 includes convex leading profile 18 that includes concave portion 20.

Concave portion 20 includes virtual impact void 22 therethrough, which defines a terminal end of passageway 24 through separation plate 60. Projections 12 are arranged so that their convex leading surfaces 18 face generally radially outward. Thus, passageways 24 extend from virtual impact voids 22 generally radially inward. In FIG. 8A, teardrop-shaped virtual impactor projections 12 are formed integrally in one unit. Optionally, a plurality of nozzle projections 68 may be provided radially outward of projections 12. Adjacent nozzle projections 68 define a tapering nozzle 69 therebetween having an inlet end 69*a* and an outlet end 69*b*. Outlet end 69*b* of each nozzle 69 is placed adjacent convex leading profile 18 of each projection 12 that is placed radially inward of nozzle 69.

First surface 60*a* defines within itself a fluid inlet 70 leading to a circular path 72. Circular path 72 is partially defined by an arcuate outer wall 74, and is arranged to surround nozzle projections 68 and teardrop-shaped virtual impactor projection 12. Optionally, first surface 60*a* may further define an exhaust path 76 radially outward of circular path 72. Exhaust path 76 forks from circular path 72, and communicates with the outside of the first surface 60*a* through a fluid outlet 78. Fluid outlet 78 is preferably located at the opposite side from fluid inlet 70 across separation plate 60.

In operation, a particle-laden fluid stream is caused to enter fluid inlet 70. If exhaust path 76 is provided, relatively heavy or dense particles in the fluid are centrifugally separated into exhaust path 76, from which they can be exhausted via fluid outlet 78. Fluid outlet 78 is preferably located at the opposite side from fluid inlet 70 so that particles exhausted from fluid outlet 78 will not be reentrained in a fluid entering fluid inlet 70. The rest of the particles entrained in the remaining fluid enter circular path 72, of which relatively heavy or more dense particles are again centrifugally separated toward outer wall 74 of circular path 72. Some of these particles may impact and become deposited on outer wall 74. Thus, the remaining fluid spirally advancing to inlet ends 69*a* of nozzles 69 may include a fewer number of relatively heavy or dense particles as compared to the number of such particles entrained in the fluid that initially entered fluid inlet 70. The fluid enters nozzles 69 through their inlet ends 69*a*, becomes aerodynamically focused and accelerated, and exits their outlet ends 69*b* to advance toward convex leading profiles 18 of teardrop-shaped projections 12. As before, teardrop-shaped projections 12 separate the fluid into a major flow and a minor flow. The major flow flows around projections 12 and is exhausted from first surface 60*a* as described below in more detail. The minor flow enters virtual impact voids 22 and passageways 24 to travel to second surface 60*b* of separation plate 60, where it can be collected, analyzed, or processed further in any other manner.

Figure 9:
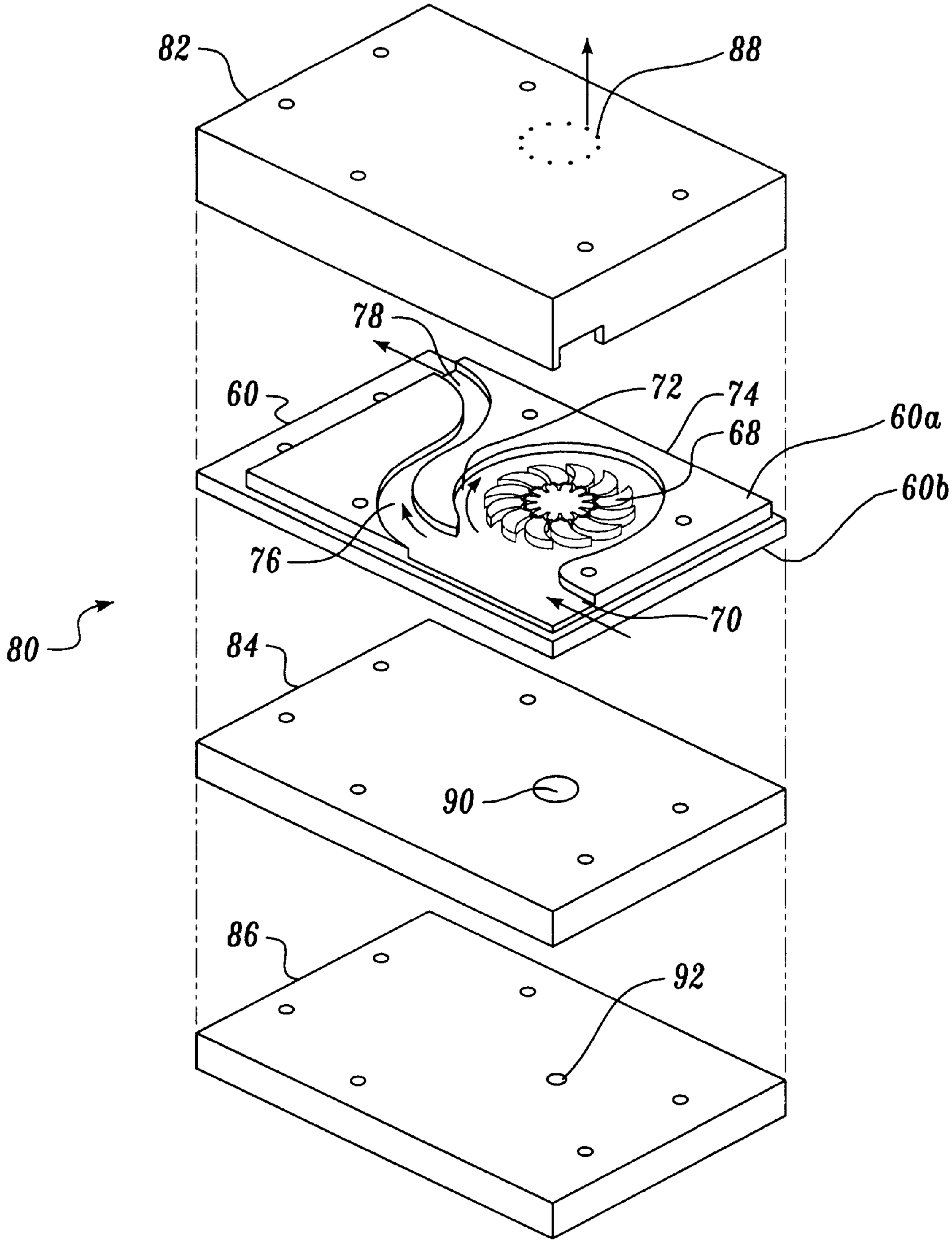
FIG. 9 is an exploded view of a virtual impact collector incorporating the separation plate of FIG. 8A.

As before, separation plate 60 of the present invention may be incorporated in various particle separation/concentration apparatus. FIG. 9 illustrates an example of such apparatus, a radial virtual impact collector 80 that incorporates separation plate 60 within. Radial virtual impact collector 80 includes a top cover plate 82, separation plate 60, a minor flow collection plate 84, and a bottom cover plate 86.

Figure 10:
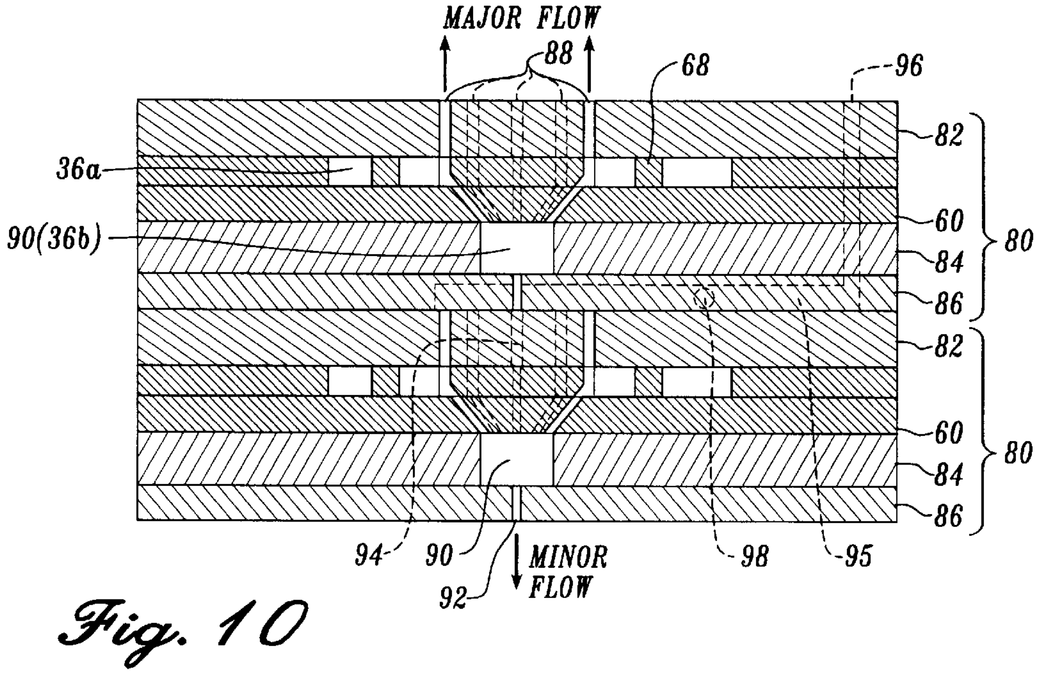
FIG. 10 is a schematic cross-sectional view of the collector of FIG. 9, wherein two such collectors are stacked together.

Radial virtual impact collector 80 is configured so that a plurality of radial virtual impact collectors 80 may be easily stacked together, as more fully described below in specific reference to FIG. 10. Referring additionally to FIG. 10, which illustrates two radial virtual impact collectors 80 stacked together, top cover plate 82 and first surface 60*a* of separation plate 60 together define a first chamber 36*a* therebetween. Fluid inlet 70 defined within first surface 60*a* provides an intake through which a particle-laden fluid stream may enter first chamber 36*a*. Fluid outlet 78 also defined within first surface 60*a* provides an outlet through which relatively heavy or dense particles may exit first chamber 36*a*. Further, top cover plate 82 defines a plurality of circularly arranged holes 88 to provide venting of first chamber 36*a*. Holes 88 are configured and arranged so that, when top cover plate 82 and separation plate 60 are combined, holes 88 coincide with concave portions 20 of projections 12 arranged in a circle to exhaust major flows therefrom, as more fully described below. Minor flow collection plate 84 defines a minor flow plenum 90. Minor flow plenum 90 is configured so that, when separation plate 60 and minor flow collection plate 84 are combined, minor flow plenum 90 fluidly communicates with terminal ends of passageways 24 that extend from projections 12 through separation plate 60. Minor flow plenum 90 forms at least a portion of a second chamber 36*b* of radial virtual impact collector 80. Bottom cover plate 86 defines a minor flow outlet 92, which fluidly communicates with minor flow plenum 90 when minor flow collection plate 84 and bottom cover plate 86 are combined. As before, all components are machined and fluidtightly assembled, preferably with screws (not shown).

In operation, a particle-laden fluid stream enters first chamber 36*a* through fluid inlet 70. As described above in connection with separation plate 60, relatively large or dense particles are centrifugally separated into exhaust path 76 and exhausted through outlet 78. Of the remaining particles entering circular path 72, relatively heavy particles are again centrifugally separated toward outer wall 74 of circular path 72. The remaining particles entrained in the remaining fluid enter nozzles 69 defined by nozzle projections 68, and advance to teardrop-shaped projections 12. As before, projections 12 separate the fluid stream into a minor flow and a major flow. Major flows are collected near concave portions 20 of projections 12, and are exhausted from first chamber 36*a* through vents 88 provided through top cover plate 82. A minor flow enters virtual impact voids 22, travels through passageways 24 into minor flow plenum 90, which defines second chamber 36*b*. The minor flow exits second chamber 36*b* through minor flow outlet 92 provided through bottom cover plate 86, to be collected, analyzed, or processed further.

The dimensions included in FIGS. 8A and 8B (all in inches) are selected to form a separation plate 60, which can separate particles of 1- to 9-micron diameter at a prescribed flow rate. A radial virtual impactor collector 80 incorporating a modified version of separation plate 60 having similar dimensions as separation plate 60 of FIGS. 8A, 8B was constructed and its particle collection efficiency was tested. The test results will be described in detail in the Examples section (Example 2). As with other separation plates hereinabove described in accordance with the present invention, those skilled in the art may readily optimize separation plate 60 of FIG. 8A for a desired cut size, flow rate, and throughput.

Referring specifically to FIG. 10, a plurality of radial virtual impact collectors 80 may be provided and stacked together to process a large volume of particle-laden fluid in parallel. Though only two collectors 80 are illustrated in FIG. 10, it should be understood that more than two collectors may be stacked together to further increase total throughput. When a plurality of collectors 80 are combined together, a minor flow conduit 94 that communicates between adjacent minor flow plenums 90 (or second chambers 36*b*) is provided to collect minor flows from all collectors 80 and exhaust them collectively. A suitable major flow conduit 95 that collects major flows from vents 88 of each collector 80 is provided. A common major flow conduit 96 may be provided to communicate between each of the major flow conduits 95 and the outside of the stacked radial virtual impact collectors 80 to collectively exhaust major flows. Alternatively, each major flow conduit 95 may communicate with the outside of stacked collectors 80 individually through a major flow outlet 98, to exhaust a major flow from each collector 80. It should be understood that means for exhausting a major flow and a minor flow from the stacked collectors 80 are not limited to those described above, and those skilled in the art may configure various other exhaust means depending on a particular application.

Figure 11:
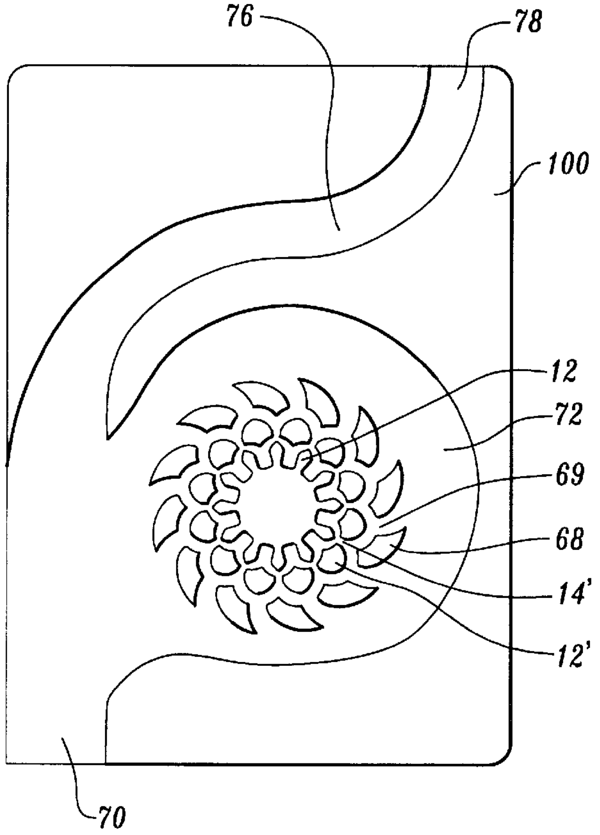
FIG. 11 is a plan view of another embodiment of a separation plate of the present invention, including a plurality of teardrop-shaped projections arranged in two circles.

FIG. 11 schematically illustrates a separation plate 100 which is a modification of separation plate 60 of FIG. 8A. As before, separation plate 100 includes a plurality of teardrop-shaped virtual impactor projections 12 arranged in a circle, and a plurality of nozzle projections 68 defining nozzles 69 therebetween arranged radially outward of teardrop-shaped virtual impactor projections 12. Separation plate 100 further includes a plurality of teardrop-shaped virtual impactor projections 12' as illustrated in FIG. 6A, arranged in a circle radially outward of virtual impactor projections 12 and radially inward of nozzles 69. Projections 12' are arranged so that convex leading profile 18' including virtual impact void 22' of each projection 12' is placed adjacent to outlet end 69*b* of each nozzle 69. Nozzles 69 serve to accelerate fluid streams advancing toward convex leading profiles 18' of projections 12'. Further, projections 12' are arranged so that adjacent projections 12' cooperate to accelerate a fluid stream toward convex leading surface 18 of projection 12 provided radially inward of projections 12'. The other configurations and operation of separation plate 100 of FIG. 11 are the same as separation plate 60 of FIG. 8A.

As apparent from the review and comparison of separation plates 60 and 100, numerous other modifications of a separation plate are available in accordance with the present invention. For example, the number of virtual impactor projections 12, 12' to be provided in each circular row, or the number of circular rows of the virtual impactor projections may be freely modifiable. The sizes of virtual impactor projection 12, 12' and nozzle projection 68 are also freely modifiable depending on a desired cut size, flow rate, and throughput.

In any of the above-described embodiments of the separation plates, it has been found that electrically charging the first surface of the separation plate improves collection efficiency of the plate. Specifically, the exterior surfaces of teardrop-shaped projections 12, 12', and nozzle projections 68, if provided, may be coated with any suitable conductive material, such as aluminum. A thickness of the coating may range approximately between 0.025 mm and 0.05 mm, although other thicknesses may be suitable. A conductive lead having a width of approximately 0.12 mm and a thickness of approximately between 0.025 mm and 0.05 mm may be provided to connect with each coated projection. Alternatively, the entire first surface of the separation plate may be coated with a conductive material. Further alternatively, an entire separation plate, or at least a portion of a separation plate, or an entire virtual impact collector of the present invention may be constructed of conductive material. The coated portions of the first surface and projections, or any elements made of conductive material, can be connected to an electric circuit including a power source, preferably a DC power source.

As many particles include an intrinsic net charge, the conductive surfaces may be charged to repel the particles, typically with a few volts. This serves to prevent the particles from becoming deposited on the conductive surfaces and, thus, to efficiently forward a major portion of the particles to the second surface of the separation plate for collection or analysis. Those skilled in the art can determine the level of charge to be applied in each application, depending on the type of particles to be separated and the effect of the charge on the flow properties of the particles.

EXAMPLE

EXAMPLE 1

A separation plate including twenty (20) columns and three (3) rows of teardrop-shaped projections, similar to those of FIG. 1, was fabricated and tested, with the column width “d” of 2.54 mm (FIG. 1D), the projection height “H” (FIG. 1B) of 0.787 mm, and the diameter of virtual impact voids and passageways of approximately 0.5 mm. The plate was made of Ultem™ polyether resin using micromilling method as known in the art. Polystyrene Latex Particles (PSL) of various diameter sizes in gaseous flow were used to measure the collection efficiency (concentration of particles in a minor flow/concentration of particles in the inlet flow) of the separation plate. At a total flow rate of approximately 20 liters per minute (LPM), the separation plate was effective in almost doubling the concentration of 1- and 2-micron diameter particles, from the inlet flow to a minor flow.

EXAMPLE 2

A radial virtual impact collector 80 incorporating a separation plate that is similar to the separation plate 100 of FIG. 11 was constructed. The separation plate differed from the separation plate 100 of FIG. 11, in that the nozzle projections 68 were replaced with the teardrop-shaped projections 12' of FIG. 6A. Thus, the separation plate included a plurality of teardrop-shaped projections arranged in three concentric circles. Fluorescent PSL particles having a diameter of 0.5 to 9 microns, entrained in dry room air, were used in the testing. Three separate pumps were used to control the flow rates of a major flow, a minor flow, and a centrifuge flow (through the exhaust path 76) at 10, 1.8, and 4.5 LPM, respectively. A Teflon filter was placed downstream of the major flow. Two glass fiber filters were placed downstream of the centrifugal flow and the minor flow, respectively. At the end of each experiment, each filter was placed in 3 ml of ethyl acetate to extract the fluorescent dye from the particles collected in the filter. A fluorescent detector was used to quantify the fluorescent dye in the ethyl acetate solution, and the particle concentration in each solution was calculated. In addition, at the end of each experiment, internal surfaces of each of the three components were washed with 3 ml of ethyl acetate to determine particle deposition onto the inner surfaces. For example, for the centrifuge flow, the particles deposited onto the inner surfaces of the exhaust path 76 were washed out. For the minor flow, the particles deposited on the inner surfaces of the minor flow plenum 90 were collected. For the major flow, the particles deposited on various inner surfaces which the major flow came in contact with were washed out. For each of the three flows, a sum of particle collection (%) was obtained as follows.

Sum of particle collection (%)=Filter Collection (%)+ Particle Loss (%)

where $$\text{Filter Collection (\%)} = \frac{C_{filter}}{C_{sumcomp} + C_{filter}} \quad (1)$$

where $C_{filter}$ is the concentration of particles collected in the specific filter, and $C_{sumcomp}$ is the concentration of particles collected from the inner surfaces of all three components, and $$\text{Particle Loss} = \frac{C_{comp}}{C_{sumcomp} + C_{filter}} \quad (2)$$

where $C_{comp}$ is the concentration of the particles collected from the inner surfaces of the particular component. The results are summarized in FIG. 12.

Figure 12:
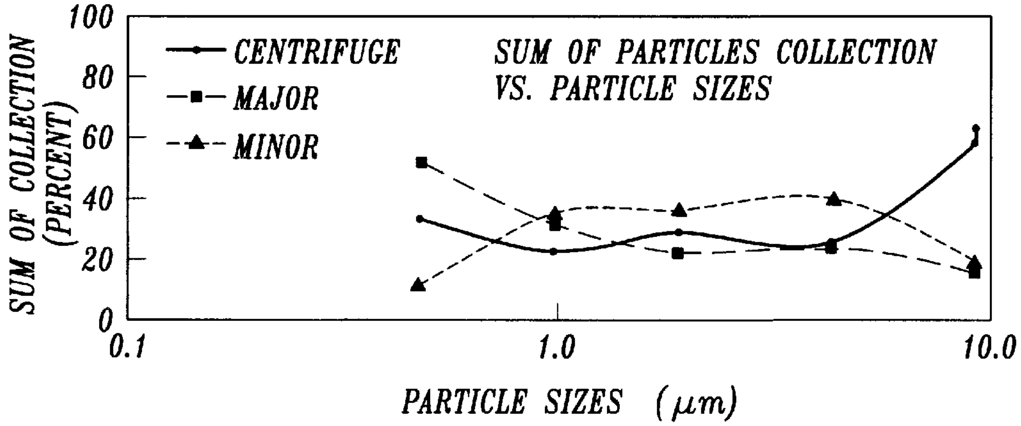
FIG. 12 is a graph showing the collection efficiency of a modification of the collector of FIG. 9.

FIG. 12 shows that the sum of the particle collection in the centrifuge flow increases dramatically from 26% to around 63% when particle size increases from 4 microns to 9 microns. It shows the effectiveness of the radial virtual impact collector in centrifugally eliminating relatively large particles. The sum of the particle collection in the minor flow is consistent in the range between 36 to 41% when the particle size ranges from 1 to 4 microns. The sum of the particle collection in the major flow decreases with increasing particle size, showing that more particles are separated into either or both of the minor flow and the centrifuge flow as the particle size increases. It should be noted that for the particle size of 1 to 9 microns, the combined sums of particles collected or deposited in the minor flow and the centrifuge flow are consistently above 50%. It demonstrates that the radial virtual impact collector is effective in separating at least 50% of the particles of interest from a major flow.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A separation plate for separating particles from a fluid stream, having a first surface and an opposing second surface, the first surface provided with a plurality of teardrop-shaped virtual impactor projections arranged in at least one row, the projection having a convex leading profile facing the fluid stream and two generally concave side surfaces that are positioned to define a tapered downstream portion, the convex leading profile defining a virtual impact void therethrough, the virtual impact void defining a terminal end of a passageway that extends through the separation plate.

2. The separation plate of claim 1, wherein the convex leading profile includes a concave portion, the virtual impact void being defined through the concave portion.

3. The separation plate of claim 1 further comprising a plurality of teardrop-shaped virtual impactor projections arranged in a plurality of rows.

4. The separation plate of claim 3, wherein the teardrop-shaped virtual impactor projections are arranged in first and second rows, the projections in the first row spaced apart from each other to define first fluid passageways therebetween, the projections in the second row spaced apart from each other to define second fluid passageways therebetween, the projections in the first row being offset from the projections in the second row.

5. The separation plate of claim 3, wherein the teardrop-shaped virtual impactor projections vary in size.

6. The separation plate of claim 1, further comprising:

a cover plate placed over the plurality of teardrop-shaped virtual impactor projections to sandwich the projections between the cover plate and the separation plate; and a first chamber at least partially defined by the cover plate and the first surface, the first chamber including an intake and a vent.

7. The separation plate of claim 6, further comprising a flow subsystem for inducing flow of the fluid stream through the first chamber.

8. The separation plate of claim 6, further comprising a second chamber that is at least partially defined by the second surface.

9. The separation plate of claim 8, wherein the second chamber includes an outlet.

10. The separation plate of claim 8, further comprising a plurality of impactors arranged within the second chamber.

11. The separation plate of claim 8, wherein the separation plate is a cylinder, the second surface of the separation plate forming the inner surface of the cylinder and defining at least a portion of the second chamber.

12. An assembly of a plurality of the separation plates of claim 8, at least two of the plurality of separation plates positioned relative to each other so that the respective second surfaces face each other and define at least a portion of the second chamber therebetween.

13. A separation plate for separating particles from a fluid stream, having a first surface and an opposing second surface, the first surface including:

a plurality of teardrop-shaped virtual impactor projections arranged in at least one circle on the first surface, the projection having a convex leading profile facing generally radially outward and two generally concave side surfaces that are positioned to define a tapered downstream portion, the convex leading profile defining a virtual impact void therethrough, the virtual impact void defining a terminal end of a passageway that extends through the separation plate; and a plurality of nozzle projections arranged radially outward of the plurality of teardrop-shaped virtual impactor projections, the nozzle projection having a tapering leading profile facing the fluid stream and two generally concave side surfaces that are positioned to define a tapered downstream portion, the tapering profiles of adjacent nozzle projections defining a nozzle passageway therebetween having an inlet end and an outlet end, the nozzle passageway generally tapering from the inlet end to the outlet end, the outlet end of each nozzle placed adjacent the convex leading profile of each teardrop-shaped virtual impactor projection that is arranged radially inward of the nozzle;

wherein the first surface defines a path within itself, the path including an inlet leading to a circular path, the circular path surrounding the teardrop-shaped virtual impactor projections.

14. The separation plate of claim 13, wherein the teardrop-shaped virtual impactor projections are arranged in first and second circles, the projections in the first circle placed radially inward of the projections in the second circle, the projections in the first circle being offset from the projections in the second circle.

15. The separation plate of claim 14, wherein the teardrop-shaped virtual impactor projections vary in size.

16. The separation plate of claim 13, further comprising:

a cover plate placed over the plurality of teardrop-shaped virtual impactor projections to sandwich the projections between the cover plate and the separation plate; and a first chamber at least partially defined by the cover plate and the first surface, the first chamber including an intake and a first vent, the intake coinciding with the inlet.

17. The separation plate of claim 16 wherein the first surface further defines an exhaust path that forks from the circular path, the exhaust path communicating with the outside of the first surface via an outlet, the first chamber further including a second vent that coincides with the outlet.

18. The separation plate of claim 17, wherein the inlet and outlet are on opposite sides of the first surface.

19. The separation plate of claim 16, further comprising a second chamber at least partially defined by the second surface.

20. An assembly of a plurality of the separation plates of claim 19, the separation plates stacked on each other, the assembly further comprising:

a minor flow conduit that communicates between adjacent second chambers; and a means for exhausting a major flow from each of the first vents.

21. The separation plate of claim 1, further comprising:

a conductive material on at least a portion of the teardrop-shaped virtual impactor projections; and a circuit including a power source for electrically charging the conductive material.

22. The separation plate of claim 1, wherein at least a portion of the separation plate is made of conductive material, and further comprising a circuit including a power source for electrically charging the conductive material.

23. The separation plate of claim 1, further comprising a plurality of nozzle projections arranged in a row upstream of the at least one row of teardrop-shaped projections, the nozzle projection having a tapering leading profile facing the fluid stream and two generally concave side surfaces that are positioned to define a tapered downstream portion, the tapering leading profiles of adjacent nozzle projections define a fluid passageway therebetween that generally tapers from upstream to downstream, a downstream end of each fluid passageway placed adjacent the convex leading profile of each teardrop-shaped virtual impactor projection that is arranged downstream of the fluid passageway.

24. A method of separation of particles from a fluid stream, comprising:

providing a separation plate having a first surface and an opposing second surface, the first surface provided with a plurality of teardrop-shaped virtual impactor projections arranged in at least one row, each projection having a convex leading profile facing the fluid stream and two generally concave side surfaces that are positioned to define a tapered downstream portion, the convex leading profile defining a virtual impact void therethrough, the virtual impact void defining a terminal end of a passageway that extends through the separation plate;

providing a cover plate to sandwich the plurality of projections between the cover plate and the first surface, thereby forming a chamber at least partially defined by the cover plate and the first surface, the chamber including an intake and a vent; and causing the fluid stream to enter the chamber through the intake and flow along the first surface of the separation plate, wherein a minor portion of the fluid stream containing a major portion of the particles is directed through the virtual impact voids and the passageways to the second surface of the separation plate, and a major portion of the fluid stream containing a minor portion of the particles flows around the projections and is exhausted from the chamber through the vent.

25. The method of claim 24, further comprising collecting the minor portion of the fluid stream from the second surface.

26. The method of claim 24, wherein the plurality of teardrop-shaped virtual impactor projections are arranged in at least one circle, the convex leading profiles of the projections facing generally radially outward, the first surface defining a path within itself, the path including an inlet leading to a circular path, the circular path surrounding the projections, the inlet coinciding with the intake of the chamber, the method further comprising:

causing the fluid stream to flow through the circular path; and centrifugally separating at least a portion of the particles from the fluid stream to the outer periphery of the circular path.

* * * * *